(12) United States Patent
Petsev et al.

(10) Patent No.: US 8,334,013 B2
(45) Date of Patent: Dec. 18, 2012

(54) MESOPOROUS METAL OXIDE MICROSPHERES AND METHOD FOR FORMING SAME

(75) Inventors: Dimiter N Petsev, Albuquerque, NM (US); Erin Derbins, Ponchatoula, LA (US); Sergio Mendez, Albuquerque, NM (US); Shailendra Rathod, Albuquerque, NM (US); Nick Carroll, Albuquerque, NM (US); David A. Weitz, Boston, MA (US)

(73) Assignee: STC.UNM, Albuquerque, NM (US)

( * ) Notice: Subject to any disclaimer, the term of this patent is extended or adjusted under 35 U.S.C. 154(b) by 1018 days.

(21) Appl. No.: 12/263,947

(22) Filed: Nov. 3, 2008

(65) Prior Publication Data
US 2009/0155563 A1    Jun. 18, 2009

Related U.S. Application Data

(60) Provisional application No. 60/985,050, filed on Nov. 2, 2007.

(51) Int. Cl.
*B32B 5/16* (2006.01)
(52) U.S. Cl. ............ 427/212; 427/213.3; 427/213.31; 428/402; 428/403; 501/53

(58) Field of Classification Search .......... 428/402, 428/403; 427/212, 213.3, 213.31; 501/53
See application file for complete search history.

(56) References Cited

U.S. PATENT DOCUMENTS

| | | | |
|---|---|---|---|
| 6,872,675 B2 * | 3/2005 | Imhof et al. | 501/12 |
| 7,449,237 B2 * | 11/2008 | Chan et al. | 428/403 |
| 7,862,892 B2 * | 1/2011 | Chan et al. | 428/403 |

OTHER PUBLICATIONS

N. Andersson et al. "Combine Emulsion . . . ", Langmuir 2007, 23, 1459-1464.*
Andersson et al., "Combined Emulsion and Solvent Evaporation (ESE) Synthesis Route to Well-Ordered Mesoporous Materials," Langmuir 2007, 23, 14-59-1464, published on the web Dec. 13, 2006.

* cited by examiner

*Primary Examiner* — Leszek Kiliman
(74) *Attorney, Agent, or Firm* — Gonzales Patent Services; Ellen M. Gonzales

(57) ABSTRACT

The present disclosure provides a method for forming populations of monodisperse porous silica particles. Also provided are monodisperse populations of porous silica particles, an array of physically connected monodisperse porous silica particles and a microfluidic device for forming populations of monodisperse porous silica particles.

9 Claims, 5 Drawing Sheets

MESOPOROUS METAL OXIDE MICROSPHERES AND METHOD FOR FORMING SAME

CROSS-REFERENCE TO RELATED APPLICATIONS

The following application claims benefit of U.S. Provisional Application No. 60/985,050, filed Nov. 2, 2007, which is hereby incorporated by reference in its entirety.

STATEMENT REGARDING GOVERNMENT SPONSORED RESEARCH

This invention was made with Government support under Grant Nos. DMR0611616, DGE0549500, and DMR0649132 awarded by the National Science Foundation. The U.S. Government has certain rights in this invention.

BACKGROUND AND SUMMARY

The synthesis of mesoporous silicate solids using surfactant templating was discovered more than a decade ago. See, e.g., Kresge, C. T.; Leonowicz, M. E.; Roth, W. J.; Vartuli, J. C.; Beck, J. S. Nature 1992, 359, 710, which is hereby incorporated by reference. A variation of the procedure, known as evaporation-induced self-assembly (EISA), involves confining all silica precursor and templating surfactant species within droplets. The solvent then progressively evaporates and that leads to an increase of the concentration of templating surfactant which, upon surpassing the critical micelle concentration, assembles into spherical or cylindrical micellar structures. See, e.g., Brinker, C. J.; Lu Y. F.; Sellinger, A.; Fan H. Y. Adv. Mater. 1999, 11, 579-585, hereby incorporated by reference. When the solvent is fully evaporated, the silica solidifies around the surfactant structures. This is followed by surfactant removal via calcination, resulting in the formation of a well ordered mesoporous silica material. EISA has been successfully utilized to fabricate well-ordered thin silica films and particles using a wide range of surfactants and block copolymers. See e.g., Brinker, C. J.; Lu Y. F.; Sellinger, A.; Fan H. Y. Adv. Mater. 1999, 11, 579-585 and Lu, Y.; Fan, H.; Stump, A.; Ward, T. L.; Riker, T.; Brinker, C. J. Nature (London) 1999, 398, 223-226, each of which is hereby incorporated by reference. However, the mesoporous silica particles obtained by EISA are usually characterized by substantial polydispersity.

Recently, Andersson et al. (Andersson, N.; Kronberg, B.; Corkery, R.; Alberius P. Langmuir 2007, 23, 1459-1464, incorporated by reference), demonstrated the synthesis of spherical, mesoporous silica particles using an approach which combines previously established emulsion-based precipitation methods (See, e.g., Schacht, S.; Huo, Q.; Voigt-Martin, I. G.; Stucky, G. D.; Schuth, F. Science (Washington, D.C.) 1996, 273 (5276), 768-771 and Huo, Q.; Feng, J.; Schueth, F.; Stucky, G. D. Chem. Mater. 1997, 9, 14-17, both incorporated by reference) with the EISA method. This synthesis route, referred to as the emulsion and solvent evaporation method (ESE), produced well-ordered 2D hexagonal mesoporous silica microspheres. The emulsions were prepared in bulk using inhomogeneous vigorous stirring. As a result, the droplets, and therefore the particles, were produced with a relatively broad size distribution. FIG. 1 shows a histogram and FIG. 2 a Scanning Electron Microscopy (SEM) image of particles obtained from a polydisperse bulk emulsion. As easily seen in the figures, the size distribution is broad and includes a wide range of particles.

The fabrication of monodisperse silica microparticles containing highly ordered nanometer-scale pores (mesopores) of controllable size presents a fundamental challenge and is of practical interest. See e.g., Rama Rao, G. V.; Lopez, G. P.; Bravo, J.; Pham, H.; Datye, A. K.; Xu, H.; Ward, T. L. Adv. Mater. 2002, 14, 1301-1304, which is hereby incorporated by reference. The microparticles can be used in a variety of applications including, but not limited to, controlled drug delivery, molecular, biomolecular and cellular encapsulation. See, e.g., Lou T.-J. M.; Soong R.; Lan E.; Dunn B.; Montemagno B. Nature Materials 2005, 4, 220-224 and Chia, S. Y.; Urano, J.; Tamanoi, F.; Dunn, B.; Zink, J. I. J. Am. Chem. Soc. 2000, 122, 6488-6489, both of which are hereby incorporated by reference. For example, monodisperse particles can be ordered into 2D and 3D arrays or lattices which allow the fabrication of catalysts with well-defined pore hierarchy. See e.g., Denkov, N. D.; Velev, O. D.; Kralchevsky, P. A.; Ivanov, I. B.; Yoshimura, H.; Nagayama, K. Langmuir 1992, 8, 3183-3190 and Dimitrov, A. S.; Nagayama K. Langmuir 1996, 12, 1303-1311, both of which are hereby incorporated by reference. Mesoporous particles also have significant potential for the design and implementation of chemical and biochemical sensors, as described, for example, in Buranda, T.; Huang, J.; Ramarao, G. V.; Ista, L. K.; Larson, R. S.; Ward, T. L.; Sklar, L. A.; Lopez, G. P. Langmuir 2003, 19, 1654-1663, which is hereby incorporated by reference.

The present disclosure provides novel methods and devices for forming monodisperse populations of microparticles. In some embodiments, the microparticles may be formed into 2- or even 3-dimensional arrays useful for a variety of applications.

DETAILED DESCRIPTION

According to an embodiment, the present disclosure provides a method for forming populations of monodisperse porous metal oxide particles. According to another embodiment, the present disclosure provides monodisperse populations of porous metal oxide particles. According to yet another embodiment, the present disclosure provides an array of physically connected monodisperse porous metal oxide particles. According to still another embodiment, the present disclosure provides a microfluidic device for forming populations of monodisperse porous metal oxide particles.

Microfluidic flow focusing devices (MFFDs) provide a straightforward and robust approach to formation of highly monodisperse emulsion drops. It has been demonstrated that microfluidic-generated drops can function as both morphological templates and chemical reactors for the synthesis of monodisperse polymer and biopolymer particles. See, e.g., Anna, S. L.; Bontoux, N.; Stone, H. A. Appl. Phys. Lett. 2003, 82, 364-366; Ikkai, F.; Iwamoto, S.; Adachi, E.; Nakajima, M. Colloid Polym. Sci. 2005, 283, 1149-1153; Serra, C.; Berton, N.; Bouquey, M.; Prat, L.; Hadziioannou, G. Langmuir 2007, 23, 7745-7750; and Zhang, H.; Tumarkin, E.; Peerani, R.; Nie, Z.; Sullan, R. M. A.; Walker, G. C.; Kumacheva, E. J. Am. Chem Soc. 2006, 128, 12205-12210, each of which is hereby incorporated by reference.

According to an embodiment, the present disclosure provides a novel procedure for fabrication of well-defined monodisperse mesoporous metal oxide particles. The droplet-based microfluidic methodology described herein can be easily developed further to allow for controlled loading and incorporation of cells, biomolecules, functionalized particles, and polymers within monodisperse, highly structured metal oxide mesoporous microspheres.

Figure 3:
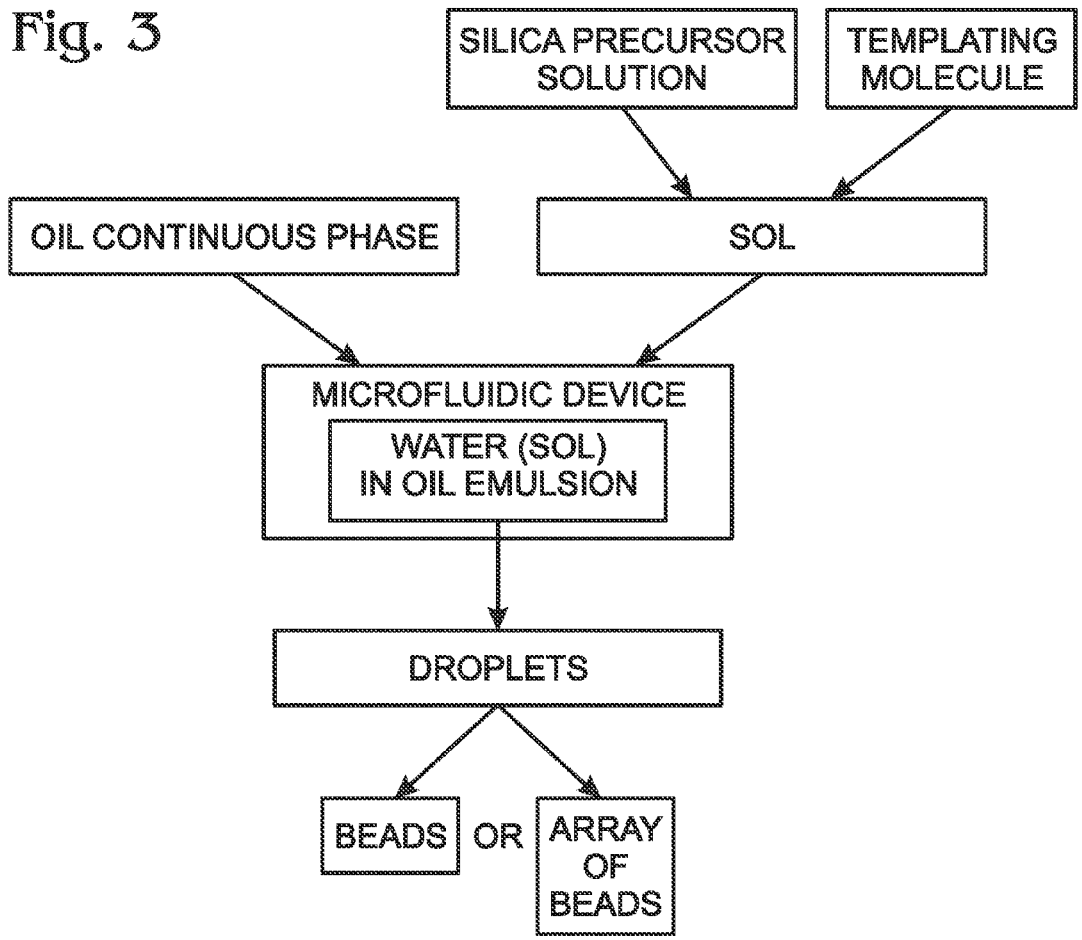
FIG. 3 is a flowchart of a method of forming monodisperse metal oxide microspheres according to an embodiment of the present disclosure.

Turning to FIG. 3, an exemplary method for forming populations of monodisperse porous metal oxide particles is shown. As shown, a metal oxide precursor solution is mixed with a templating molecule to form an aqueous-based sol. The metal oxide may be silica or another suitable metal oxide including, but not necessarily limited to $SnO_2$, $TiO_2$, $RuO_2$, $NbO_2$ and $Nb_2O_5$. The sol dispersed phase and an oil phase are supplied to separate inlet channels of a microfluidic device (MFFD). The MFFD is configured such that the two inlet channels converge. The fluids are forced to emulsify as they travel through the point of convergence. The resulting water in oil emulsion, where the inorganic siliceous precursor solution acts as the water phase, forms droplets as it is forced through a central channel in the MFFD. The droplets are then collected, heated to expel the solvents ($H_2O$ and alcohol) and allowed to polymerize, thereby forming metal oxide particles. Finally, the particles are separated from the oil and calcined to remove the templating surfactant. The end result is a population of mesoporous metal oxide beads that are all extremely similar in size.

Of course it will be appreciated that the methods described herein could be used to produce a monodisperse population of solid beads as well, if that is desirable, by simply omitting the templating surfactant from the sol.

According to an embodiment, a silica precursor solution may be prepared by hydrolyzing 5.2 g of tetraethylorthosilicate (TEOS, Purum>98%) in 3 g of ethanol (99.7%), and 2.7 g of 0.01 N hydrochloric acid (pH=2) under vigorous stirring at room temperature for 30 min. Other suitable methods of forming a silica precursor solution include are described in Bore, M. T.; Rathod, S. B.; Ward, T. L.; Datye, A. K. Langmuir 2003, 19, 256, which is hereby incorporated by reference.

In order to complete the preparation of the aqueous-based sol, 1.4 g of the amphiphilic, triblock copolymer templating molecule (Pluronic, BASF: P104) was dissolved in 5.43 g of DI water and subsequently mixed with the hydrolyzed TEOS solution. This particular recipe allows the use of Pluronic surfactant as a templating reagent in the presence of a much lower concentration of ethanol than used in previously described methods. See e.g. Andersson et al., previously incorporated by reference. However, any suitable method for forming the aqueous-based sol, including those using higher concentrations of ethanol (such as those described by Andersson et al.,) may be used.

According to an embodiment, emulsification of the aqueous siliceous precursor was achieved by supplying the sol dispersed phase and organic oil continuous phase to the microfluidic device using two digitally-controlled Harvard Pico Plus syringe pumps. The continuous phase was prepared by dissolving ABIL EM 90 (Degussa) surfactant in hexadecane (3 wt %) which served as an emulsion stabilizer. Of course it will be appreciated that various other suitable surfactants could be used and those of skill in the art will be familiar with those surfactants that are available.

The use of the MFFD in the presently described process allows one to carefully control the rate of droplet formation, by controlling the rate of flow through the device. According to an exemplary embodiment, a volumetric flow rate for the dispersed sol was optimized to 0.5 µL/min, with a flow rate of 3.5 µL/min for the continuous oil phase, resulting in droplet (and therefore particle) production of approximately 100 droplets per second. However, droplet production rates of between 10 and $10^3$ droplets per second are believed to be easily obtainable, while rates of between 10 and $10^4$ could be achieved.

According to an embodiment, the MFFD-produced droplets were transferred to a 50 mL round bottom flask, and heated to 80° C. under a reduced pressure of 70 mTorr for two hours. The flask was pretreated with RAIN-X solution to make it hydrophobic. This prevented the droplets from sticking to the flask bottom. To prevent droplet flocculation and coalescence before the sol-gel transition is complete, the emulsion was subject to constant stirring at 200 rpm. This stirring was sufficient to keep the droplets suspended and separated. At the same time it did not lead to shear deformation. The particles were then collected and centrifuged followed by calcination in air at 500° C. for 5 h to remove the templating surfactant.

Figure 4:
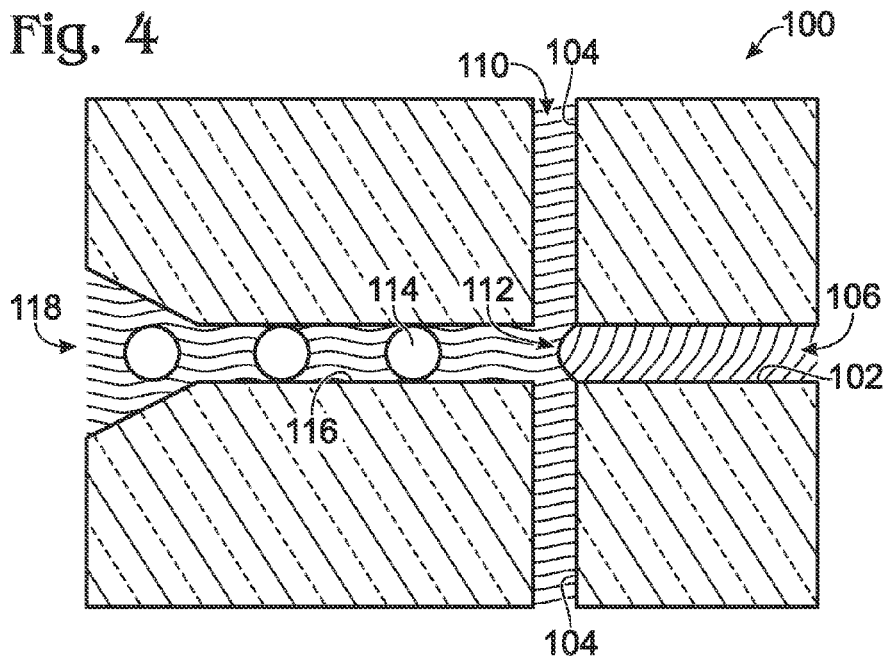
FIG. 4 is a schematic diagram of a microfluidic device according to an embodiment of the present disclosure.

Turning now to FIG. 4, an exemplary microfluidic device (MFFD) is shown. MFFD 100 includes a first inlet channel 102 for the inorganic siliceous precursor solution 106 and second and third inlet channels 104 for the oil phase 110. Channels 102 and 104 converge at 112, where emulsification takes place. The resulting droplets 114v travel through central channel 116 to outlet 118, where they can be collected for further processing. While the channels in the depicted MFFD are shown in a t-shaped configuration, it will be understood that alternative configurations may be used. For example, Y-shaped geometries may be suitable. Furthermore, a particular MFFD may include additional inlet channels, for example, to delivery additional solutions or biological or non-biological materials, and or additional outlet channels, for example to allow for the simultaneous manufacture of differently-sized populations of particles. Furthermore, such additional channels may require different geometries. It will further be appreciated that such channels may include valves or other fluid control mechanisms, as needed, and that such structures are commonly used in microfluidic devices and will be familiar to those of skill in the art.

According to an exemplary embodiment, an SU-8 photoresist-templated poly(dimethylsiloxane) (PDMS) microfluidic device was fabricated using a well established soft-lithography method, as described in Xia, Y. N.; Whitesides, G.

M. *Angew. Chem., Int. Ed.* 1998, 37, 550-575 (19), which is hereby incorporated by reference. Of course it will be appreciated that any suitable method of microfluidic device fabrication may be used, as determined by the particular needs and resources of the practitioner.

Figure 5:
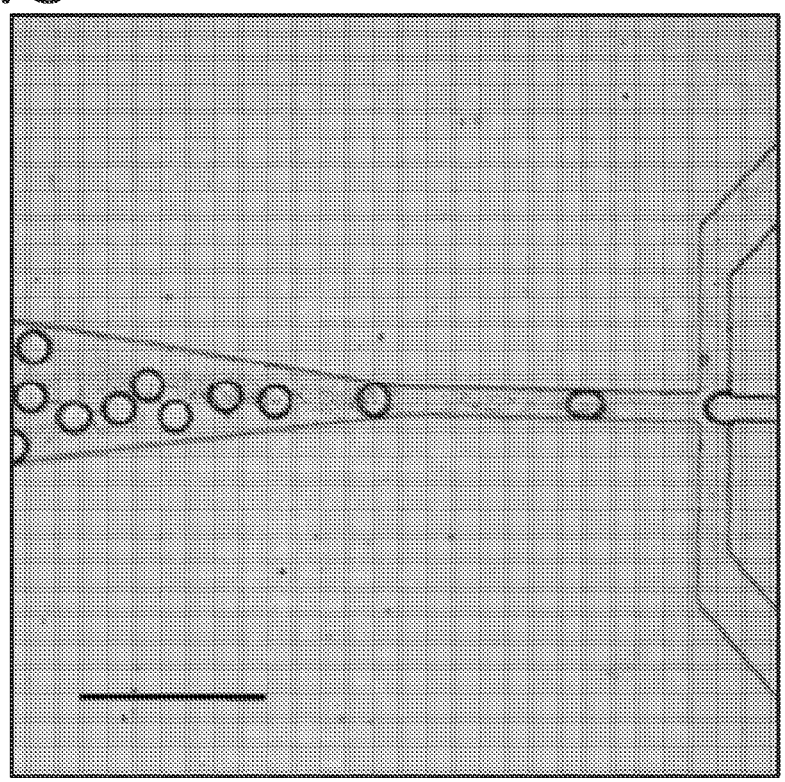
FIG. 5 is an optical microscopy image of droplets of silica precursor solution emulsified in a microfluidic device according to an embodiment of the present disclosure.

FIG. 5 is an optical microscopy image of droplets of silica precursor solution emulsified in hexadecane using a T-shaped microfluidic device fabricated as described above. The channel dimensions of the orifice were 25 µm wide by 30 µm high. Using this microfluidic device, we were able to form monodisperse droplets, the size of which, depended on the dimensions of the microchannels, the flow rates in the central and side (inlet) channels, the viscosity of the fluids (water/ethanol and oil) and the surfactant. Accordingly, a single device can be used to produce monodisperse populations that vary in size by changing the relative magnitude of the viscous and interfacial forces that are involved. Using the device shown in FIG. 5, we were able to vary the droplet size by 1 to 3 times the channel width. A wider range of sizes can be achieved by manufacturing microfludic devices with differently sized channels. Alternatively, a single microfluidic device having multiple center channels, each with a different size, may be desirable, as it would allow for a greater range of sizes.

The lower limit for the dimension for soft lithography is determined by the printing process that is used. Fabricating channels that are about 10 µm wide using soft lithography is quite plausible. Such channels will produce particles of order 5 µm in diameter. To produce smaller particles one may need to fabricate smaller channels using different methods or exploiting the extreme hydrodynamic regimes. See e.g., Garcia, A.; Ista, L. K.; Petsev, D. N.; O'Brien, M. J.; Bisong, P.; Mammoli, A. A.; Brueck, S. R. J.; Lopez, G. P. Lab on a Chip, 2005. 5, 1271-1276; O'Brien, M. J.; Bisong, P.; Ista, L. K.; Rabinovich, E. M.; Garcia, A. L.; Sibbett, S. S.; Lopez, G. P.; Brueck, S. R. J. J. Vac. Sci. Technol. B, 2003. 21, 2941-2945; and/or Anna, S. L.; Bontoux, N.; Stone, H. A. Appl. Phys. Lett. 2003, 82, 364-366, each of which is hereby incorporated by reference.

Figure 6:
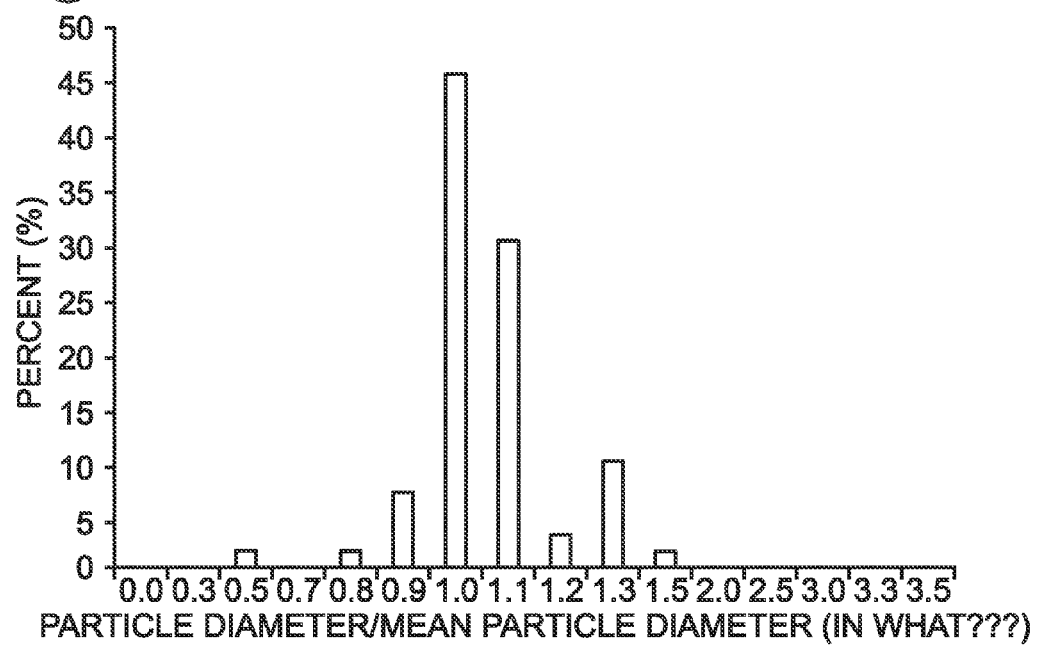
FIG. 6 shows the size distribution of silica microspheres obtained using the method of FIG. 3.
Figure 7:
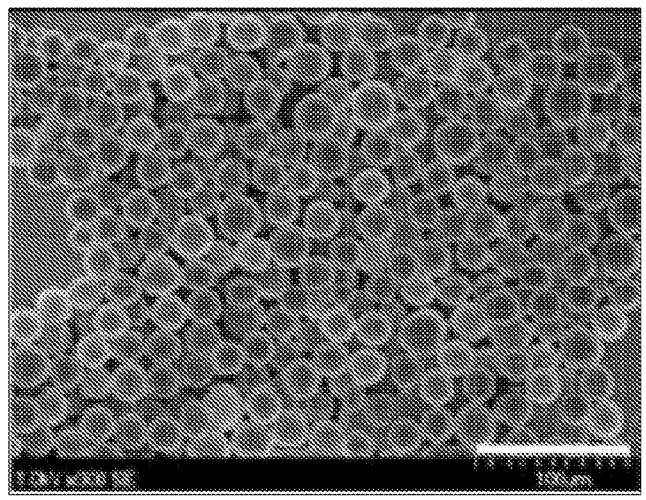
FIG. 7 is an SEM image of particles using the method of FIG. 3.

The evaporation of the solvent necessary to form the solid mesoporous spheres leads to an overall size reduction. Therefore the final particles are approximately half the size of the original droplets. The size distribution (actual diameter divided by mean diameter) and the corresponding scanning electron microscopy (SEM) image of the particles are shown in FIGS. 6 and 7, respectively. These particles were obtained using the microfluidic device shown in FIG. 5 which has 25 µm wide channels. This device can produce droplets between 25 and 75 µm and particles about half that size. SEM was done on a Hitachi S-800 instrument. The particle size distribution in FIG. 6 exhibits one well defined peak centered around 23 µm. Particles like these are obtained from droplets that were initially between 35 and 40 µm in diameter. After expelling the solvent (water and ethanol) the final size is the one shown in FIGS. 6 and 7. Returning to FIG. 6, it can be seen that there is a second peak at 30 µm. This peak is most likely due to some coalescence that occurred before the droplets turned into silica particles.

Figure 1:
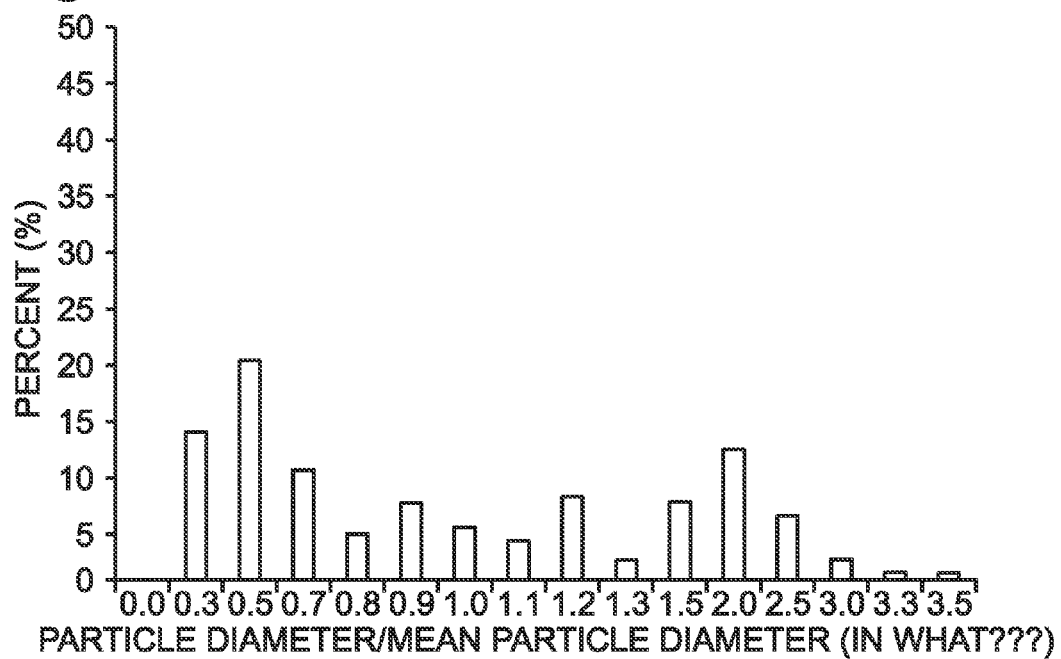
FIG. 1 is a histogram showing the particle diameter and mean particle diameter of particles obtained from a previously described polydisperse bulk emulsion process.
Figure 2:
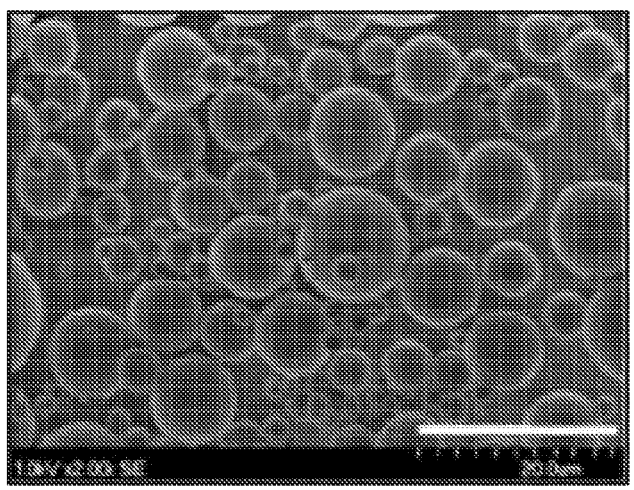
FIG. 2 is an SEM image of particles obtained from the polydisperse bulk emulsion process.

When the histograms and images of FIGS. 6-7 are compared with those of (the prior art) FIGS. 1-2, it can be seen that the presently described method and microfluidic device results in particles that are significantly more monodisperse than the particles that result from the previously described method. According to some embodiments, a monodisperse population of spheres is defined as a population in which all of the spheres have a similar size, surface area, and mass. According to other embodiments, a monodisperse population of spheres may be defined as a population in which the actual diameter of the spheres divided by the mean diameter of the spheres is between 0.5 and 1.5. According to yet another embodiment, a monodisperse population of spheres may be defined as one in which the diameter of each of the spheres in the population is equal to or less than 0.01 standard deviation away from the mean diameter.

Figure 8:
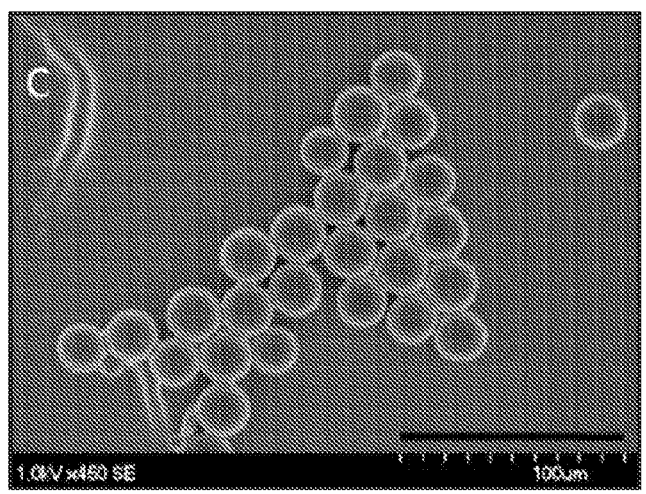
FIG. 8 is a scanning electron microscopy image of particles obtained using the method of FIG. 3, where the particles have fused together to form a hexagonal array.
Figure 9:
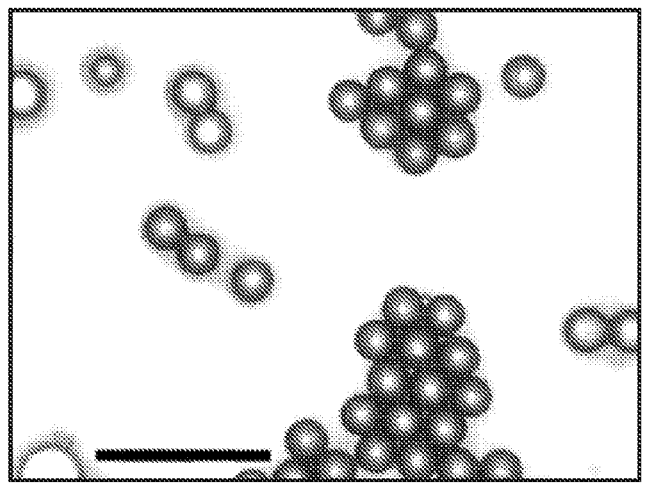
FIG. 9 is an optical photograph of particles obtained using the method of FIG. 3, where the particles have fused together to form a hexagonal array.

As discussed above, the particles might stick together during the final stages of solvent evaporation. This sticking could be exploited to obtain arrays of interconnected particles. Such interconnection adds to the structural integrity and allows robust two dimensional layers of well defined monodisperse mesoporous particles to be fabricated. A layer of bound particles can be manipulated, transferred to different substrates and incorporated into other applications as catalysis, sensing, etc. An example of such multi-particle 2D structure is depicted in FIGS. 8 and 9. These Figures show a scanning electron microscopy image and an optical photograph of particles that have stuck together in a hexagonal array. The particles are connected by "bridges" which form when the particles come into contact before the completion of the gelation process.

Figure 10:
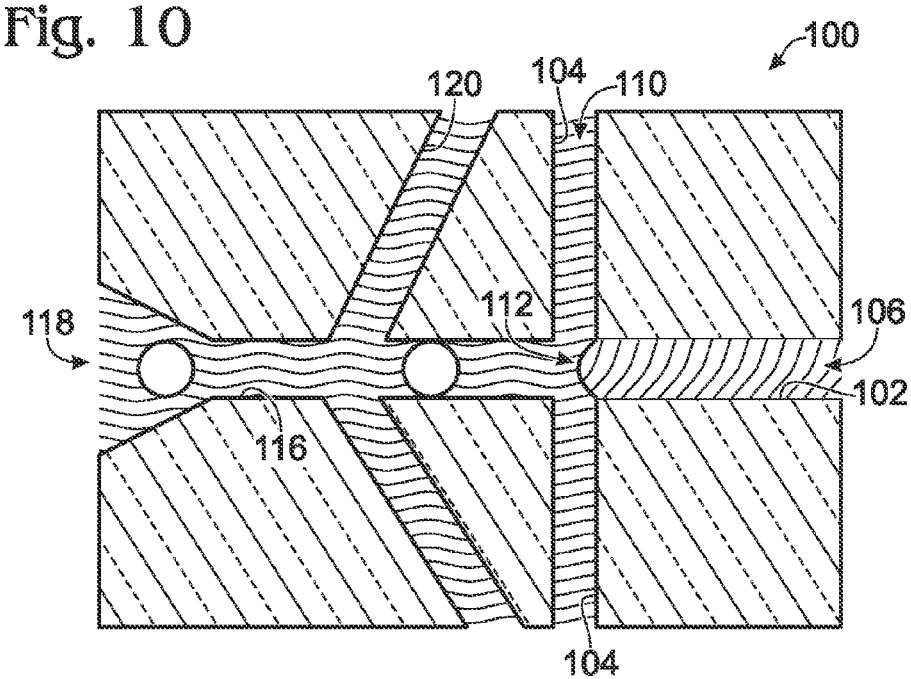
FIG. 10 is a schematic diagram of another microfluidic device according to an embodiment of the present disclosure.

If it is desirable to prevent the spheres from sticking together, the microfluidic device can be manufactured to include a third inlet through which an additional stream of infuses oil into the central channel. An exemplary microfluidic device including an additional inlet channel 120 is shown in FIG. 10. The additional oil adds fluidic volume into the system, thus acting to provide greater spacing between the sol droplets as they travel downstream through the channel. The greater spacing reduces interaction between the droplets which aids in preventing coalescence between neighboring droplets as they exit the microfluidic device and enter the collection tubing.

Figure 11:
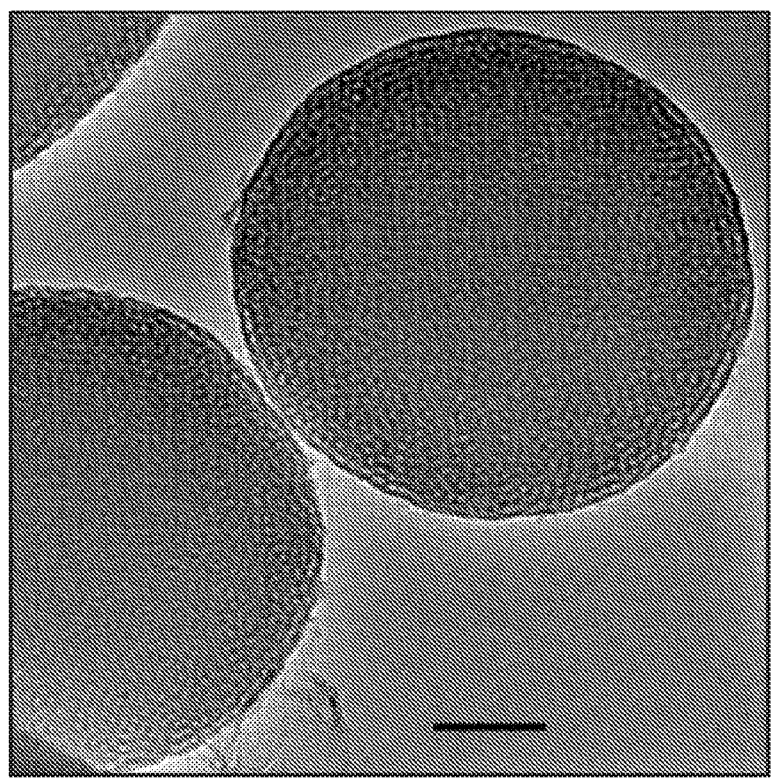
FIG. 11 is a transmission electron microscope image of silica microspheres formed using the method of FIG. 3 containing mesostructured pores that are well ordered by the surfactant.

FIG. 11 shows a transmission electron microscope image of a silica particle with an internal ordered mesoporous structure. Transmission electron microscopy (TEM) was conducted on JEOL 2010 and 2010F instruments. The pores have approximately uniform size, which for the surfactant that we used is 6.4 nm and have pore volume 0.56 $cm^3/g$.4 The pores seem to be closed at the surface, similar to that reported by others using different methodologies and instrumentation. Accordingly, microfluidics can be successfully used to fabricate metal oxide spheres with well defined size and internal porosity. Other types of water soluble surfactants may be used for templating, which could extend the range of pore sizes and morphology.

We have demonstrated that microfluidics can be successfully used to fabricate monodisperse mesoporous metal oxide particles with well-defined size. A great advantage of the monodisperse particles is that they can be ordered in 2D or even 3D arrays on various substrates. Controlled bridging and sticking of the particles allows fabrication of arrays with sufficient structural integrity for subsequent manipulation and application. Monodisperse mesoporous particles can also be ordered in three dimensional structures for example by repeated deposition of layers following the techniques described, for example, in Prevo, B. G.; Velev, O. V. Langmuir, 2004 20, 2099-2107 and Prevo, B. G.; Fuller, J. C.; Velev, O. V. Langmuir, 2005 21, 28-35, each of which is hereby incorporated by reference. This would allow structures with well defined pore hierarchy to be obtained. Accordingly, it is believed that structures as large as one square inch or more could be obtained using the methods and devices described herein.

Particles with surfactant templated mesopores define two very different length-scales: one in the micrometer (particle size) range and the other in the nanometer (surfactant templates) range. The methodology developed here can be applied to derive mesoporous particles in a wide variety of sizes and can be modified to include other metal oxides.

The processing conditions for the surfactant templating described in this work are very different from those used in the alternative aerosol method. The kinetics of solvent evaporation in our case is much slower because the solvents (water and alcohol) are transported across the continuous hexadecane phase. This means that the surfactant has a longer time to self assemble into micellar structures that are closer to equilibrium. In the aerosol method the solvent removal is very fast and some of the structures can be kinetically trapped. Thus, the slower kinetics of the presently described method will lead to better control of the pore structure and sizes. It also allows the study of the surfactant self-assembly process in the metal oxide which is not tractable when the solvent evaporation is too fast. Solvent evaporation and removal across the continuous organic (hexadecane) phase can also be used to obtain other mesoporous structures like films and membranes. These structures do not require the use of microfluidics but may benefit from the slower kinetics provided by this technique.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a particle" includes a plurality of such particles, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed is:

1. A method for forming a monodisperse population of mesoporous metal oxide particles comprising:
   providing a microfluidic device comprising one central and two side channels, a point of convergence between the three inlet channels and an outlet channel extending away from the point of convergence;
   hydrolyzing 5.2 g of tetraethylorthosilicate (TEOS, Purum >98%) in 3 g of ethanol (99.7%), and 2.7 g of 0.01 N hydrochloric acid (pH=2) under vigorous stirring at room temperature for 30 min to form a sol-dispersed aqueous phase;
   delivering the sol-dispersed aqueous phase to the central inlet channel in the microfluidic device;
   delivering an oil continuous phase to the two side inlet channels in the microfluidic device;
   allowing the aqueous phase and oil continuous phase to emulsify at the junction and form droplets within the microfluidic device;
   collecting the droplets;
   allowing the droplets to polymerize, thereby forming particles;
   separating the particles from the oil; and
   removing the templating molecule to form a monodisperse population of mesoporous metal oxide beads.

2. The method of claim 1 wherein the droplets are allowed to form bridges during polymerization such that an array of monodisperse mesoporous beads is formed.

3. The method of claim 2 wherein the array is a two-dimensional array.

4. The method of claim 2 wherein the array is a three-dimensional array.

5. The method of claim 1 further comprising preventing bridges from being formed during polymerization such that a population of unconnected monodisperse mesoporous beads is formed.

6. The method of claim 5 wherein the microfluidic device further comprises additional side inlets, the method comprising delivering oil to the additional inlets so as to provide greater spacing between the droplets.

7. The method of claim 1 further comprising control the flow rate of the sol-dispersed aqueous phase and continuous phases in order to control the size of the beads.

8. The method of claim 1 wherein the population of beads consists of beads having a diameter that is within 0.01 standard deviations of the mean bead diameter.

9. The method of claim 1 wherein 1.4 g of an amphiphilic, triblock copolymer templating molecule (Pluronic, BASF: P104) is dissolved in 5.43 g of DI water and subsequently mixed with the hydrolyzed TEOS solution.

* * * * *

UNITED STATES PATENT AND TRADEMARK OFFICE
CERTIFICATE OF CORRECTION

PATENT NO. : 8,334,013 B2
APPLICATION NO. : 12/263947
DATED : December 18, 2012
INVENTOR(S) : Petsev et al.

It is certified that error appears in the above-identified patent and that said Letters Patent is hereby corrected as shown below:

In the Specification

Column 1, lines 15-18, please replace "This invention was made with Government support under Grant Nos. DMR0611616, DGE0549500, and DMR0649132 awarded by the National Science Foundation. The US. Government has certain rights in this invention." with -- This invention was made with Government support under Grant Nos. DMR0611616, DGE0549500, DMR0649132, and CBET-0828900 awarded by the National Science Foundation. The US. Government has certain rights in this invention. --

Signed and Sealed this
Sixth Day of August, 2013

Teresa Stanek Rea
*Acting Director of the United States Patent and Trademark Office*